(12) United States Patent
Tsanghuai (10) Patent No.: US 6,639,694 B1
(45) Date of Patent: Oct. 28, 2003

(54) IMAGING APPARATUS WITH DIVERS RESOLUTION

(75) Inventor: Chang Tsanghuai, Changhua (TW)

(73) Assignee: Umax Data Systems Inc., Hsin Chu (TW)

( * ) Notice: Subject to any disclaimer, the term of this patent is extended or adjusted under 35 U.S.C. 154(b) by 589 days.

(21) Appl. No.: 09/654,902

(22) Filed: Sep. 5, 2000

(51) Int. Cl.[7] .............................. H04N 1/40; H04N 1/04; H04N 5/225; H04N 9/083; H01L 27/00

(52) U.S. Cl. ..................... 358/471; 358/482; 358/483; 358/474; 358/486; 250/208.1; 348/219.1; 348/270; 348/351

(58) Field of Search ................. 358/474, 482, 358/483, 486; 250/208.1; 348/219.1, 270, 351

(56) References Cited

U.S. PATENT DOCUMENTS

| | | | | |
|---|---|---|---|---|
| 4,751,376 A | * | 6/1988 | Sugiura et al. | 250/201.8 |
| 5,802,217 A | * | 9/1998 | Suzuki et al. | 382/274 |
| 6,151,419 A | * | 11/2000 | Aoki | 382/274 |
| 6,236,430 B1 | * | 5/2001 | Suzuki et al. | 348/219.1 |
| 6,424,433 B1 | * | 7/2002 | Miyauchi et al. | 358/471 |

\* cited by examiner

*Primary Examiner*—Edward Coles
*Assistant Examiner*—Houshang Safaipour
(74) *Attorney, Agent, or Firm*—Troxell Law Office PLLC (57) ABSTRACT

An imaging apparatus with divers resolution includes a light source, a reflection lens set, a major lens and an image-capture unit. The light source is used to illuminate a document for further generating a document image. The reflection lens set includes a plurality of reflection lenses for forwarding the document image consecutively to the major lens. The major lens is used to receive the document image transported by the reflection lens set and to form the document image at a focal point thereof. The image-capture unit includes a plurality of image-capture elements with various resolution for meeting divers usage requirements. While in usage, a suitable image-capture element with particular resolution can be shifted to the focal point of the major lens for performing the imaging.

13 Claims, 8 Drawing Sheets

IMAGING APPARATUS WITH DIVERS RESOLUTION

BACKGROUND OF THE INVENTION (1) Field of the Invention

The invention relates to an imaging apparatus with divers resolution, and more particularly to which can perform document scanning according to a predetermined resolution setting by switching among divers image-capture elements with respective resolution defaults.

(2) Description of the Prior Art

An imaging apparatus or a scanner is one of popular computer peripherals. In an imaging apparatus, an interior image-capture unit such as a CCD is used to generate an image from a document rested upon a document plate. The image as a form of digital signals are then forwarded to a computer for further image processing or storage.

Figure 1:
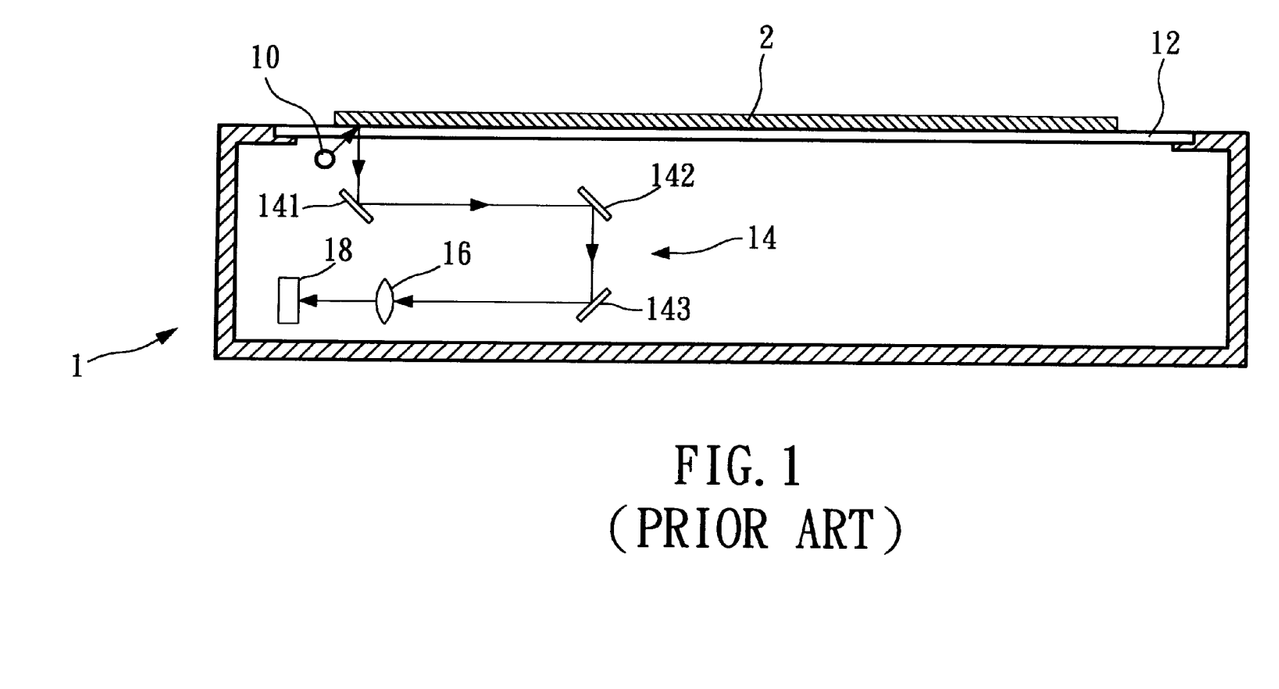
FIG. 1 is a schematic view of an optical scanner in the art.

Referring now to FIG.1, a conventional optical scanner is shown schematically. The optical scanner 1 includes a light source 10, a document carrier plate 12, a reflection lens set 14, a major lens 16 and an image-capture element 18. The light source 10 is usually a lengthy fluorescent tube for illuminating the document 2 rested upon the document carrier plate 12. The document carrier plate 12 is a transparent plate made of glass or acrylic for supporting the document 2 thereofupon. The reflection lens set 14 includes a plurality of reflection lenses, say 141, 142 and 143 for example. By providing these reflection lenses 141, 142 and 143, a proper light path for forwarding the document image can be established. In an imaging process, the reflection lens set 14 can receive and forward the document image captured from the document 2 rested upon the carrier plate 12. The document image is then sent to the major lens 16 via the reflection lenses 141, 142 and 143. In the art, the major lens 16 is a convex lens for focusing the document image to its focal point. The image-capture element 18 for capturing the document image is located right at the focal point for the major lens 16. In the art, the image-capture element 18 can be an electric charge coupling device (CCD) as an example.

Because the optical scanner is used to process document imaging and the imaging quality does highly depend upon the resolution of the image-capture element, a necessary condition for a scanner to have improved imaging quality is obvious that the scanner must include a high-resolution image-capture element. Generally, high resolution implies that the image-capture element needs to provide a huge number of pixels within a unit length of the document. Apparently, the more number of the pixels are required in the imaging process, the slower the imaging is performed.

Though a high-resolution scanner can provide better quality to the document image, yet plenty process time is required as an unavoidable tradeoff. However, for documents that the originals are already clear enough, for those that the originals include only simple drawing, or for those that clear copies are not required, a user might feel time-wasting to duplicate those document by using a high-resolution scanner. On the other hand, for the users to duplicate those documents, a simple, low-resolution and fast scanner may only meet the need. Therefore, to resolve the problem, some high-rank scanners in the market do provide a convenient switch function for the users being capable of determining if a document should apply a high-resolution imaging process or a low-resolution imaging process.

Currently, three methods as following have been applied to the switching mechanism of the aforesaid scanner. They are:

1. Integrating a zoom lens to the image-capture element;
2. Integrating a plurality of lens to the image-capture element; and
3. Integrating a plurality of lens to a plurality of image-capture elements.

Basically, a common ideology for all three methods to achieve the operation of resolution-alternating is to vary the focus of the major lens. Among these three aforesaid methods, method 3 might need much higher cost in production due to more components being applied. On the other hand, though the application of methods 1 and 2 might need fewer components, yet a complicate switching mechanism is required to render the focus alternation.

In the early development stage of the optical scanners, the adjusting of the imaging resolution is mainly done through varying the focus of the major lens due to the higher cost and lower resolution of the image-capture element (CCD, for example). However, current image-capture technology has been improved to an extend that lower production cost and higher resolution are feasible. Hence, developing a technique of applying a single major lens to integrate several image-capture elements with various resolution will definitely contribute a lot to the market competitiveness of the product.

SUMMARY OF THE INVENTION

Accordingly, it is a primary object of the present invention to provide an imaging apparatus with divers resolution, in which the lower production cost and the higher resolution are two basic features.

The imaging apparatus with divers resolution in accordance with the present invention includes a light source, a reflection lens set, a major lens and an image-capture unit. The light source is a lengthy fluorescent tube for illuminating a document to further generate a document image. The reflection lens set includes a plurality of reflection lenses for forwarding the document image consecutively to the major lens. The major lens is used to receive the document image transported by the reflection lens set and to form the document image at a focal point of the major lens. The image-capture unit includes a plurality of image-capture elements with various resolution for meeting divers usage requirements. According to the present invention, a suitable image-capture element with particular resolution can be shifted to the focal point of the major lens for performing the image capturing.

BRIEF DESCRIPTION OF THE DRAWINGS

The present invention will now be specified with reference to its preferred embodiment illustrated in the drawings, in which

FIG. 3A~FIG. 3C are a series of schematic views of the first embodiment performing a typical resolution switch;

DESCRIPTION OF THE PREFERRED EMBODIMENT

The invention disclosed herein is directed to an imaging apparatus with divers resolution. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

As described in the previous section, the high-rank scanner in the art applies various major lenses to attain the function of resolution alternating or resolution shift. Obvious disadvantages for such an application are higher production cost for including various major lenses and difficulty in constructing a complicate lens-switching mechanism. However, in the present invention, the function of resolution shift to attain a particular imaging resolution is performed by utilizing a respective image-capture element selected from several image-capture elements with various resolution for imaging. Details for embodying the present invention are described below.

Figure 2:
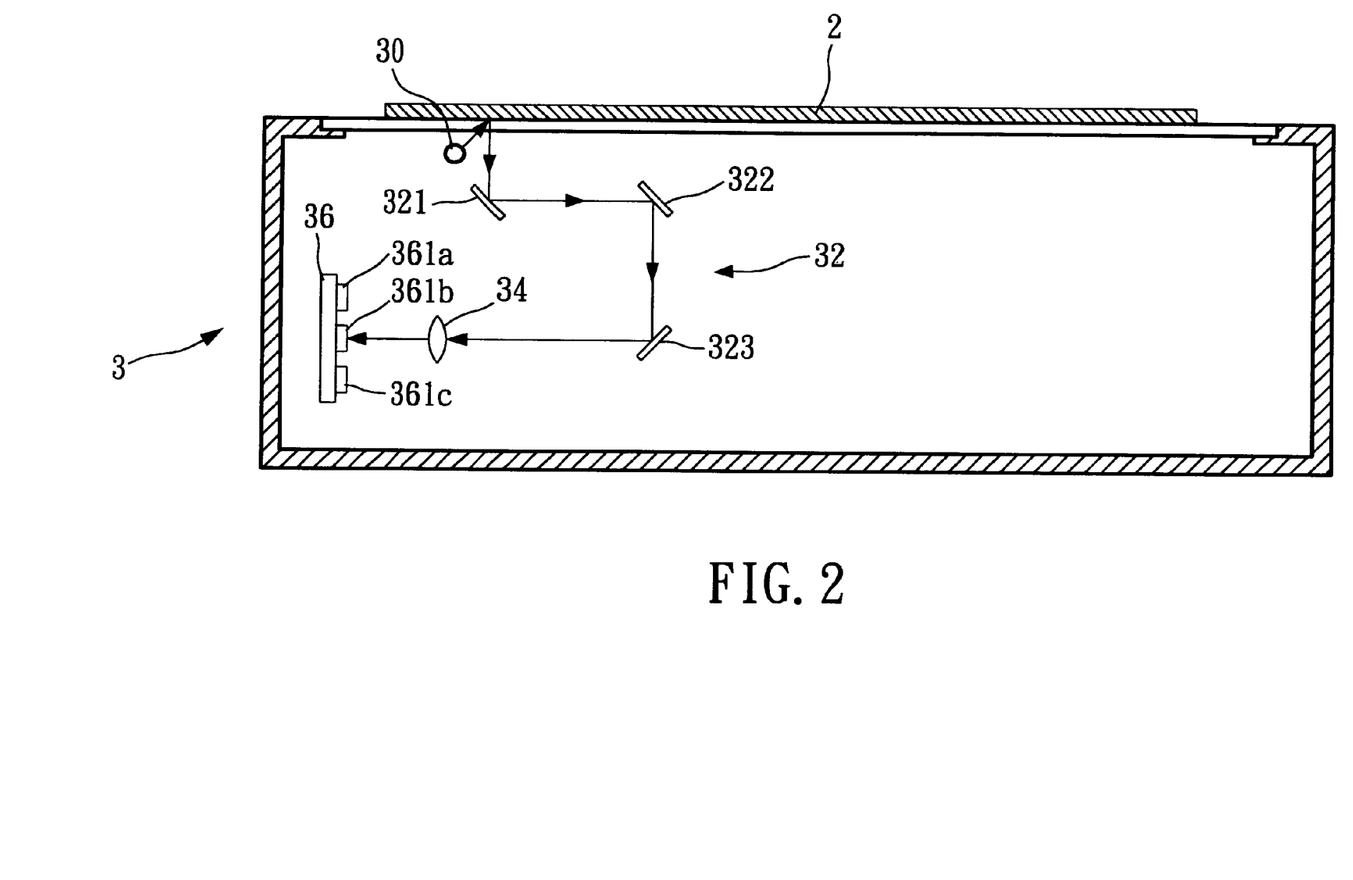
FIG. 2 is a schematic view of a first embodiment of the imaging apparatus with divers resolution in accordance with the present invention.

Referring now to FIG.2, a first embodiment of the imaging apparatus with divers resolution according to the present invention is shown schematically. The imaging apparatus 3 includes a light source 30, a reflection lens set 32, a major lens 34 and an image-capture unit 36. The light source 30 is a lengthy fluorescent tube for illuminating a document to generate an document image. The reflection lens set 32 for forwarding the document image includes a plurality of reflection lenses; say preferably 321, 322 and 323 in FIG.2. The reflection lenses 321, 322 and 323 are used to provide a suitable optical path for transmitting the document image to the major lens 34. The major lens 34 is a convex lens with focal function for forming an image at its focal point according to the document image received from the reflection lens set 32.

Figure 3A:
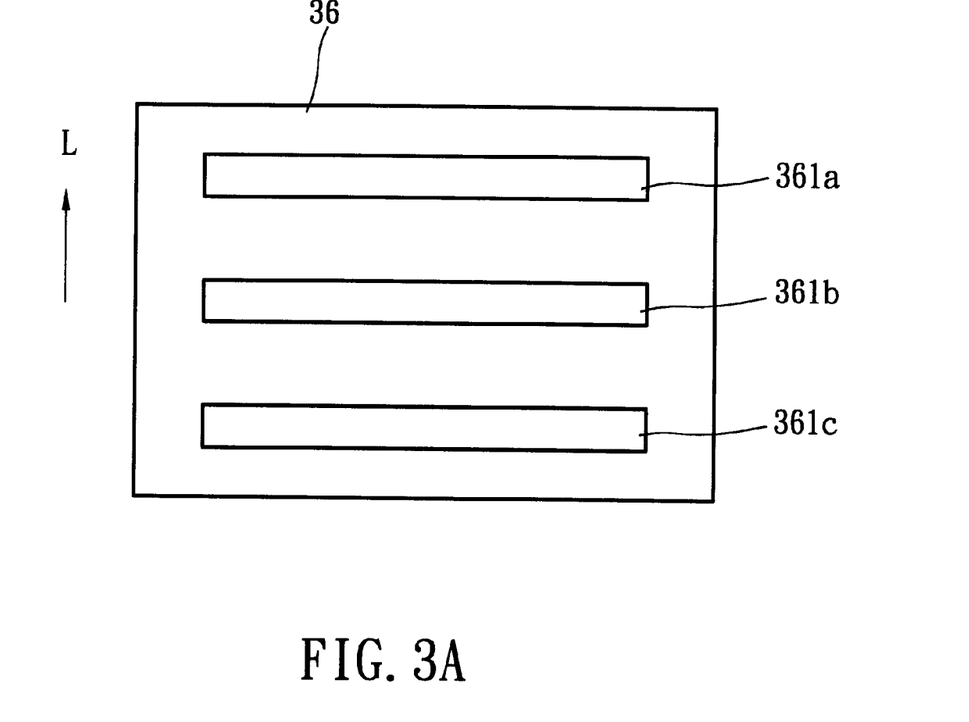
Figure 3B:
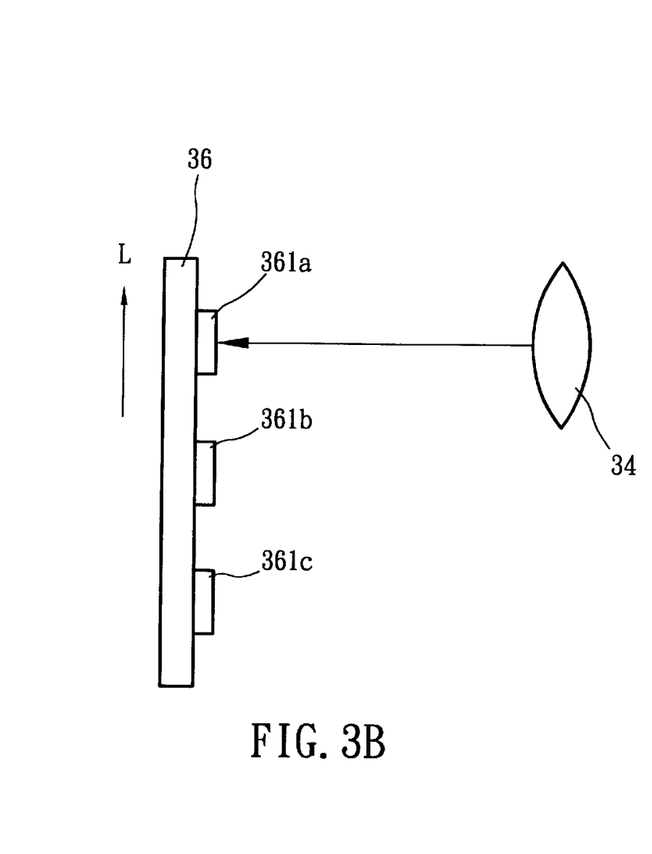
Figure 3C:
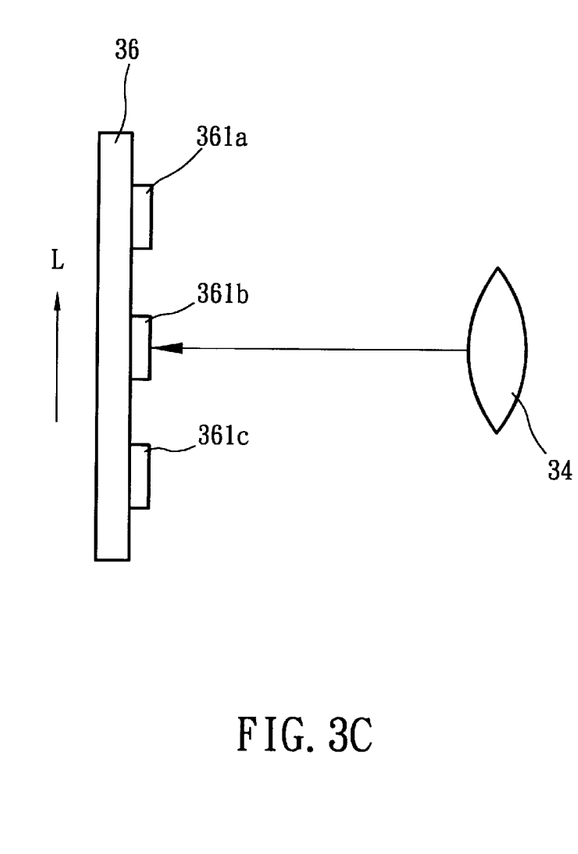

Referring now to FIGS. 3A to 3C, the image-capture unit 36 includes a plurality of image-capture elements 361 having divers resolution settings. The focal point of the major lens 34 is located at a specific point of the image-capture unit 36. The image-capture elements 361 can be the charge coupling devices (CCD) and are lined up straightly. The image-capture unit 36 further includes a driving mechanism (not shown in all figures) for linearly moving the image-capture elements 361 along an L-direction as shown. The driving mechanism of the present invention can be a manual mechanism, an electronic control mechanism, or the like. Upon the driving mechanism moving the image-capture elements 361, one of the image-capture elements 361 will be move to the focal point of the major lens 34. By such an arrangement of the present invention, a particular image-capture element 361 with suitable resolution can be selected to perform the imaging according to a practical requirement.

Figure 4A:
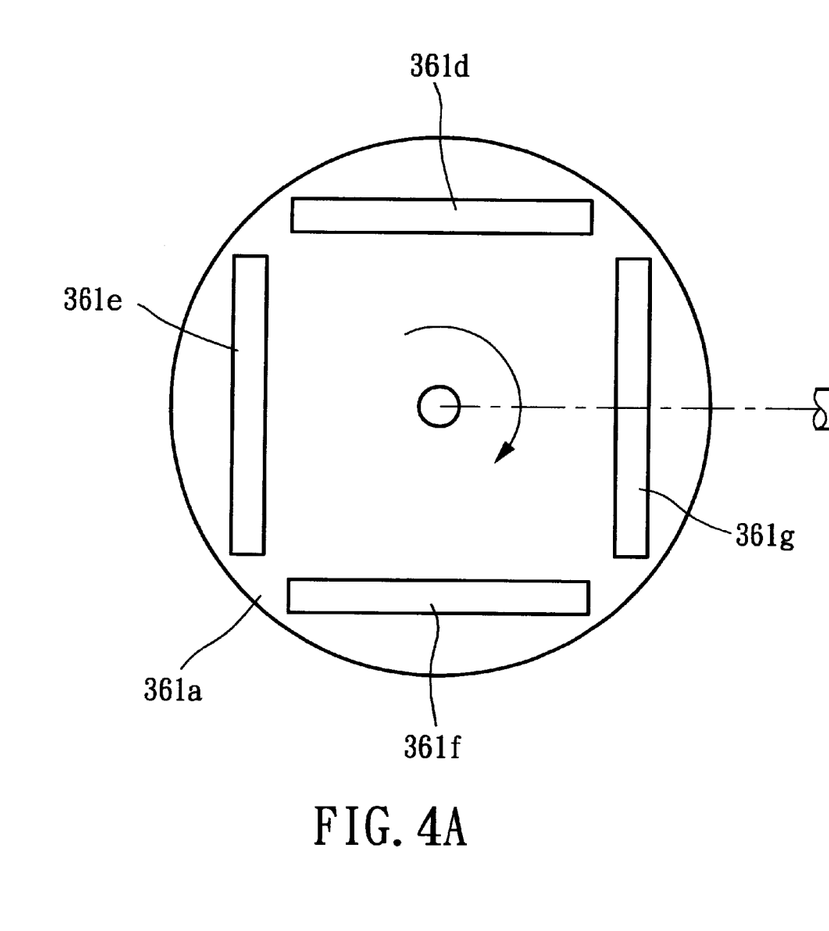
FIG. 4A~FIG. 4B are schematic views of the first embodiment performing another resolution switch.
Figure 4B:
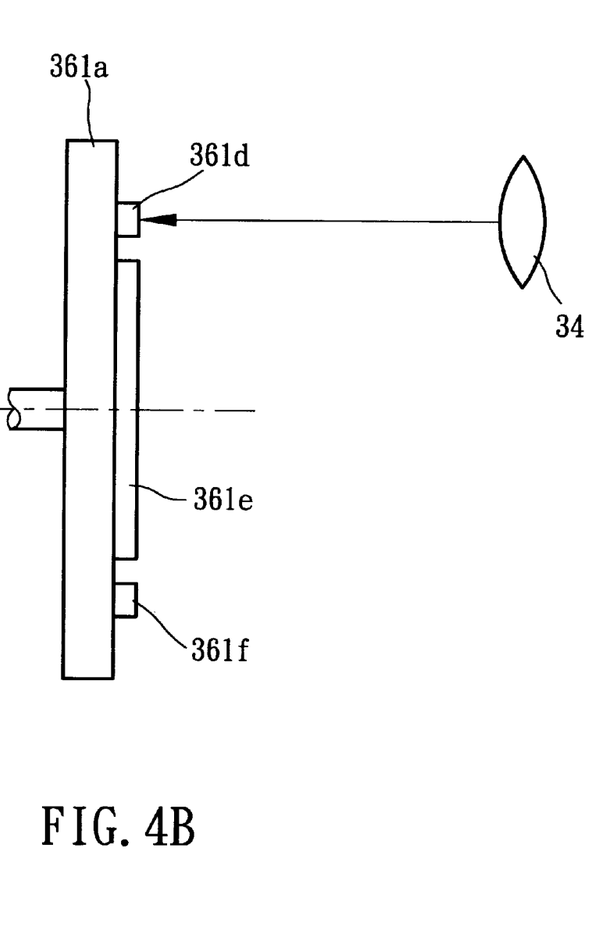

Referring now to FIG. 4A to FIG. 4B, the image-capture unit 36a can be a turntable mechanism, in which the image-capture elements 361 is arranged annually on a turntable. The image-capture unit further includes a driving mechanism (not shown in the figure) for manually or electronically automatically rotating the image-capture unit 36a to move a specific image-capture element 361 with respective resolution to the focal point of the major lens 34.

Figure 5A:
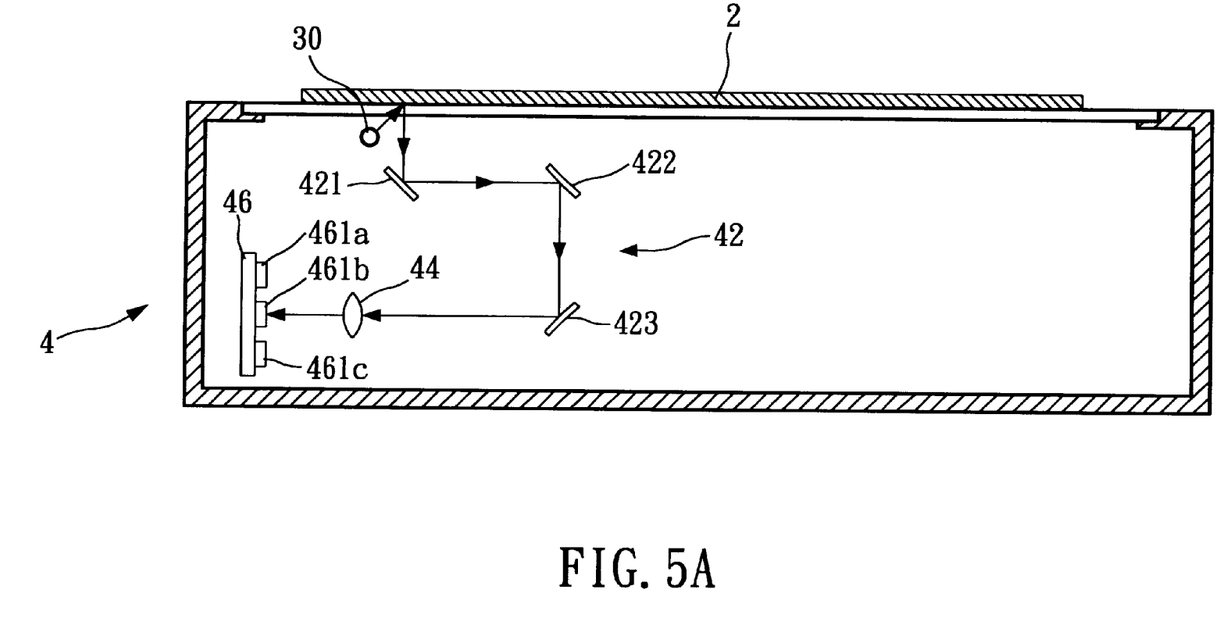
FIG. 5A is a schematic view of a second embodiment of the imaging apparatus with divers resolution in accordance with the present invention.
Figure 5B:
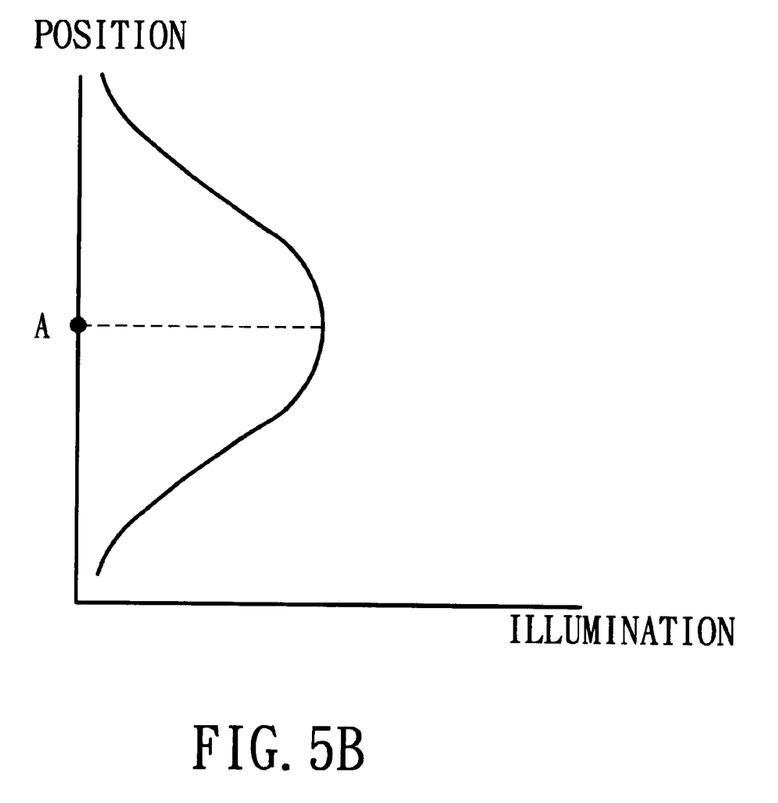
FIG. 5B illustrates the relationship between the illumination and the position for the second embodiment of FIG. 5A.

Referring now to FIGS. 5A and 5B, a second embodiment of the imaging apparatus with divers resolution in accordance with the present invention is shown. The imaging apparatus 4 includes a light source 30, a reflection lens set 42, a major lens 44 and an image-capture unit 46. In this embodiment, the light source 30, the reflection lens set 42 and the major lens are all resembled respectively to those of the first embodiment described previously. The image-capture unit 46 of the second embodiment includes a plurality of image-capture elements 461 with respectively resolution. In the application, the image-capture elements 461 are preferably located to the focal point A of the major lens 44 as close as possible. It should be noted that the document image will be focused to a spot with a substantial area (not a point) by the major lens 44. Within the spot, the localized illumination is decreased to the spot rim from the central focal point A as shown in FIG. 5B. However, as long as the localized illumination does not decrease too much in the domain of the spot, any of the image-capture elements 461 of the image-capture unit 46 fallen within the spot can capture the document image. Therefore, it is obvious that the major difference between the first and the second embodiments is the inclusion of the driving mechanism for moving the image-capture elements 461 of the image-capture unit 46 to capture the document image. In the second embodiment, the image-capture unit 46 is fixedly mounted, and a switching device (not shown in the figure) is introduced to electronically control the selection of a specific image-capture element 461 with appropriate resolution for image capturing. The image captured by the image-capture element 461 is then sent for further computer processing.

Figure 6:
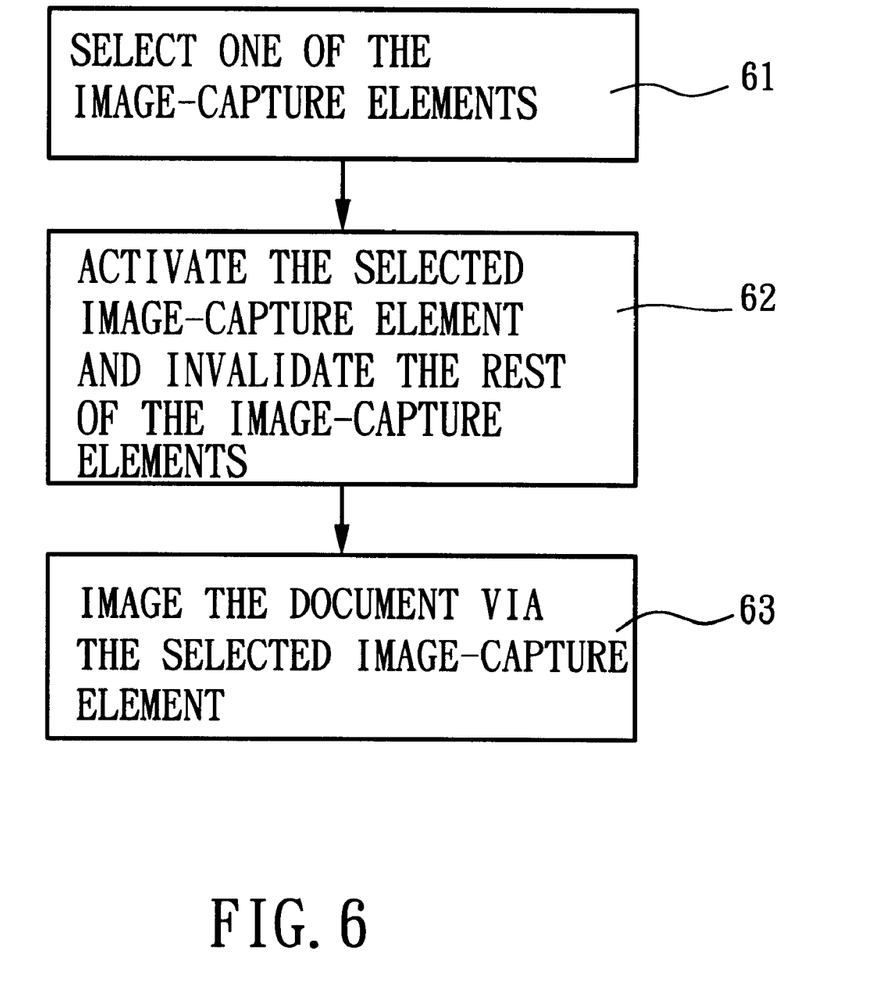
FIG. 6 is a flow chart showing the control algorithm of the resolution shift of the second embodiment.

Referring now to FIG. 6, a flow chart is shown to explain the control algorithm of the resolution shift of the second embodiment. Firstly, one of the image-capture elements 461 is selected according to the resolution thereof (step 61). Then, an electronic controller is used to activate the selected image-capture element 461 and invalidate the rest of the image-capture elements 461 of the image-capture unit 46 (step 62). Finally, the selected image-capture element 461 is utilized to perform the imaging of the document (step 63). As shown in the flow chart, the electronic controller is used to determine the selected image-capture element 461 with specific resolution for imaging; so that the resolution shift for the second embodiment can be achieved.

As described above, the imaging apparatus with divers resolution in accordance with the present invention mainly introduces the technique of integrating a single major lens with a plurality of image-capture elements with various resolution. Due to a substantial price down of the image-capture elements as CCD recently in the market and also due to the upgrade of the resolution technology, it is feasible to produce a low-cost imaging apparatus with various selection upon imaging resolution. In the first embodiment of the present invention, the resolution shift is obtained by linearly moving the image-capture unit. The driving mechanism for such moving motion is obviously easy to be constructed. On the other hand, in the second embodiment of the present invention, the image-capture unit is constructed motionless, but a switching device electronically controlled is introduced to proceed the resolution shift. Therefore, in the second embodiment, the cost for constructing a driving mechanism to move the image-capture unit can be waived.

While the present invention has been particularly shown and described with reference to a preferred embodiment, it will be understood by those skilled in the art that various changes in form and detail may be without departing from the spirit and scope of the present invention.

I claim:

1. An imaging apparatus with divers resolution, comprising:
   - a light source for illuminating a document to form a respective document image;
   - a major lens for receiving the document image and for imaging the document imaging at a focal point thereof; and
   - an image-capture unit, including a plurality of image-capture elements with respectively various resolution, one of the image-capture elements as a selected image-capture element being moved to the focal point for performing the imaging while operating the imaging apparatus.

2. The imaging apparatus with divers resolution according to claim 1, wherein said image-capture unit is moved linearly to locate said selected image-capture element.

3. The image apparatus with divers resolution according to claim 1, wherein said imaging-capture unit is a turntable mechanism for being rotationally moved to locate said selected image-capture element.

4. The image apparatus with divers resolution according to claim 1, wherein said imaging-capture element of said imaging-capture unit is a charge coupling device.

5. The imaging apparatus with divers resolution according to claim 1 includes at least one reflection lens arranged to obtained an optical path for forwarding said document image.

6. The imaging apparatus with divers resolution according to claim 1, wherein said image-capture unit is moved manually to locate said selected image-capture element.

7. The imaging apparatus with divers resolution according to claim 1, wherein said image-capture unit is moved electronically to locate said selected image-capture element.

8. An imaging apparatus with divers resolution, comprising:
   - a light source for illuminating a document to form a respective document image;
   - a major lens for receiving the document image and for imaging the document imaging at a focal point thereof; and
   - an image-capture unit, located at the focal point of the major lens, including a plurality of image-capture elements with respectively various resolution for forming thereon the document image;
   - characterized on that: the image-capture unit further includes a switching device for determining one of the image-capture elements per a user's need as a selected image-capture element for performing document imaging.

9. The image apparatus with divers resolution according to claim 8, wherein said imaging-capture element of said imaging-capture unit is a charge coupling device.

10. The imaging apparatus with divers resolution according to claim 8 includes at least one reflection lens arranged to obtained an optical path for forwarding said document image.

11. The imaging apparatus with divers resolution according to claim 8, wherein said switching device of said image-capture unit is an electronic device for locating said selected image-capture element.

12. The imaging apparatus with divers resolution according to claim 8, wherein said image-capture elements of said image-capture unit are arranged close to said focal point of said major lens.

13. The imaging apparatus with divers resolution according to claim 8, wherein said switching device includes operations of:
   (a) selecting one of said image-capture element as said selected image-capture element;
   (b) using an electronic controller to activate said selected image-capture element and to invalidate the rest of said image-capture elements; and
   (c) imaging said document via said selected image-capture element.

* * * * *